(12) United States Patent
Sastry (10) Patent No.: US 7,232,115 B2
(45) Date of Patent: Jun. 19, 2007

(54) GAS-LIQUID CONTACTING TRAY

(75) Inventor: Asheesh Viswanatha Sastry, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/918,557

(22) Filed: Aug. 13, 2004

(65) Prior Publication Data

US 2005/0046051 A1    Mar. 3, 2005

(30) Foreign Application Priority Data

Aug. 13, 2003 (EP) ................................. 03077534

(51) Int. Cl.
*B01F 3/04* (2006.01)

(52) U.S. Cl. ................. 261/114.1; 261/114.5; 202/158

(58) Field of Classification Search .. 261/114.1–114.5; 202/158
See application file for complete search history.

(56) References Cited

U.S. PATENT DOCUMENTS

| | | | |
|---|---|---|---|
| 1,770,221 A | 7/1930 | Sweeny | |
| 3,410,540 A | 11/1968 | Bruckert | 261/113 |
| 3,729,179 A * | 4/1973 | Keller | 261/114.1 |
| 3,822,869 A * | 7/1974 | Van Kleef | 261/114.1 |
| 4,159,291 A * | 6/1979 | Bruckert et al. | 261/114.1 |
| 4,550,000 A | 10/1985 | Bentham | 261/114 |
| 4,956,127 A | 9/1990 | Binkley et al. | 261/114 |
| 5,098,615 A * | 3/1992 | Resetarits | 261/114.1 |
| 5,366,666 A * | 11/1994 | Chuang et al. | 261/97 |
| 5,382,390 A | 1/1995 | Resetarits et al. | 261/114.3 |
| 5,387,377 A * | 2/1995 | Chuang | 261/97 |
| 5,407,605 A | 4/1995 | Resetarits et al. | 261/98 |
| 5,554,329 A * | 9/1996 | Monkelbaan et al. | 261/98 |
| 5,632,935 A | 5/1997 | Yeoman et al. | 261/114.1 |
| 5,683,493 A * | 11/1997 | Stober | 95/219 |
| 5,702,647 A | 12/1997 | Lee et al. | 261/114.5 |
| 6,053,484 A * | 4/2000 | Fan et al. | 261/114.1 |
| 6,293,526 B1 * | 9/2001 | Fischer et al. | 261/97 |
| 6,722,639 B2 * | 4/2004 | Ender et al. | 261/97 |
| 6,902,154 B2 * | 6/2005 | Bosmans et al. | 261/114.1 |
| 2001/0015502 A1 * | 8/2001 | Konijn | 261/114.1 |
| 2001/0038155 A1 * | 11/2001 | Bachmann et al. | 261/97 |
| 2003/0102581 A1 * | 6/2003 | Fischer | 261/114.1 |
| 2003/0183957 A1 * | 10/2003 | Zarabi | 261/114.4 |

FOREIGN PATENT DOCUMENTS

| | | |
|---|---|---|
| GB | 2002650 | 2/1979 |
| GB | 1416731 | 12/1995 |
| WO | 01/60485 | 8/2001 |

OTHER PUBLICATIONS

"Distillation Design", Henry Z. Kister, McGraw-Hill Inc., 1992 pp. 260-291.

* cited by examiner

*Primary Examiner*—Scott Bushey
(74) *Attorney, Agent, or Firm*—Wiliam E. Hickman (57) ABSTRACT

A gas-liquid contacting tray equipped with downcomers having sidewalls with liquid outlet openings, which openings are provided with a liquid guiding device such as a lip or a spout. In one embodiment the contacting tray constitutes an upper tray having downcomer(s) which are arranged in parallel, and symmetrically, with downcomers on a lower tray.

34 Claims, 3 Drawing Sheets

GAS-LIQUID CONTACTING TRAY

FIELD OF THE INVENTION

The invention relates to a gas-liquid contacting tray, in particular to a such a tray comprising a tray plate having top and bottom surfaces, in which tray plate a downcomer inlet opening is arranged, and a downcomer for guiding liquid from the top surface of the tray plate to a downcomer outlet opening below the tray plate.

BACKGROUND OF THE INVENTION

Such a tray is normally horizontally mounted in a vertical column, and the terms upward, downward, top, and bottom are used in the specification and in the claims with reference to this normal tray arrangement. The vertical column can for example be a column for counter-currently contacting gas and liquid, such as a fractionation column, wherein a plurality of similar trays are vertically stacked.

Each of such trays normally comprises a bubble area, which is an area on the tray plate that is provided with tray openings, e.g. perforations or special valves, through which gas can upwardly pass during normal operation. In this way gas is allowed to bubble through the liquid present on the tray during normal operation, thereby achieving intimate gas-liquid contact. Liquid is normally received on the tray from the liquid outlet of the downcomer of an upper tray. The tray is arranged such that liquid flows a certain distance over the tray during which time gas can bubble through, before the liquid is removed from the tray and guided to a lower tray via a downcomer.

The liquid outlets of the downcomers can in particular be arranged above the level of liquid on the liquid receiving tray. Such downcomers are commonly referred to as truncated downcomers.

U.S. Pat. No. 4,550,000 discloses a known tray which comprises a number of parallel rectangular sloped downcomers. A rectangular downcomer has a substantially rectangularly shaped inlet opening. A rectangular sloped downcomer is a downcomer of which the longer sidewalls are inclined towards each other in downward direction. The lower end of the known downcomers is formed by a bottom plate wherein the liquid outlet openings are arranged, so that interference of liquid streams from adjacent downcomers is prevented.

It was observed that a problem occurs when such downcomers are operated at high liquid loads. The liquid leaving through the liquid outlets falls with such a velocity on to the next lower tray, that the liquid may pass directly through any perforations directly below the downcomer. This is a problem since normally the liquid that is received on a certain tray must travel some distance to the next downcomer inlet opening so as to have sufficient residence time for gas-liquid contact on that tray. Also if trays with floating valves are used, the momentum of the liquid received on the lower tray may push the valves directly below the downcomers downwards, thereby closing the tray openings on the next lower tray, so that gas cannot bubble through the liquid receiving area. This problem is not encountered when no perforations or valves are arranged in a liquid receiving area underneath the downcomers of the upper tray. However this is undesirable since the unperforated liquid receiving area is arranged at the cost of bubble area, whereas it is normally desired to maximise the bubble area for optimum fractionation efficiency.

U.S. Pat. No. 4,550,000 discloses a solution to this problem by arranging a perforated structure made of expanded metal on the lower tray, underneath the liquid discharge openings of the upper downcomer. The perforated structure serves to break up and at least partly deflect the liquid stream. However, such perforated structures are not normally applied in practice because of their complexity and manufacturing cost.

Clearly the problem described hereinbefore increases with increasing velocity of the liquid impacting on the tray below. Particularly high liquid velocities are observed with trays comprising highly sloped rectangular downcomers as described in International patent application publication No. WO 01/60485.

U.S. Pat. No. 5,407,605 discloses a gas-liquid contacting tray comprising a perforated tray deck and a plurality of rectangular downcomers, each having a pair of planar sidewalls that are inclined towards each other so that the downcomers have triangular cross-section. The bottom part of the downcomers is sealed and the inclined walls are provided with liquid outlet openings in the form of perforations. In this way a horizontal velocity component away from the downcomer is imparted to the liquid exiting the liquid outlet openings. The known tray is useful for spreading the liquid over any packing which may be located below the tray. Also, when no packing is arranged so that the liquid is directly received by a lower tray, the horizontal velocity component helps directing the liquid onto the decking area of the tray below.

However, it was found that it is difficult to control or optimize the distribution of liquid from the downcomer outlet openings onto the tray below, in order to make optimum use of the bubble area. Under given process conditions in the column the flow path of liquid exiting from the known downcomer is mainly determined by the angle of the sidewall with the vertical.

UK patent application publication No. GB 2 002 650 discloses a vertical column comprising two trays that are vertically stacked in the column. On each tray a plurality of rectangular downcomers is arranged that extend parallel to each other over the width of the tray, in between perforated bubble area. The floor members of the downcomers are provided with openings through which the liquid exits vertically downwardly. In order to prevent weeping of liquid from the upper downcomers through the lower fluid contact area, transversely beneath the downcomer openings a lip means is arranged, that gives a horizontal velocity component to the liquid exiting the downcomer perpendicular to the length direction of the downcomer. In one embodiment of the known trays the downcomers on both trays extend parallel to each other, and the downcomers of the lower tray are transversely so much displaced, that the liquid from the upper tray is not discharged directly into the downcomer of the underlying tray. In another embodiment the downcomers on both trays extend in mutually perpendicular directions, and the liquid exiting from the upper downcomer flows parallel between the downcomer inlet openings on the lower tray.

It is desired to provide a gas-liquid contacting tray with a downcomer, which allows controlled or optimized distribution of the liquid from the downcomer over the tray below, in particular such that the use of bubble area on the tray below and the overall tray efficiency can be maximised.

SUMMARY OF THE INVENTION

The invention provides a gas-liquid contacting tray suitable for horizontal mounting in a normally vertical column for counter-currently contacting gas and liquid, which tray comprises:
  a tray plate having top and bottom surfaces, in which tray plate a downcomer inlet opening is arranged; and
  a downcomer for guiding liquid from the top surface of the tray plate to below the tray, which downcomer has a sidewall extending downwardly from the downcomer inlet opening, in which downcomer sidewall a liquid outlet opening is arranged, wherein the liquid outlet opening is provided with a liquid guiding means.

The expression 'downcomer sidewall extending downwardly from the downcomer inlet opening' refers to any shape of sidewall of a downcomer having an outlet below the tray level, when the tray is horizontally arranged. In particular, the sidewall can be vertical, or fully or partially inclined with respect to the normally horizontal tray orientation.

Liquid exiting during normal operation from the liquid outlet opening in the downcomer sidewall has at least a horizontal velocity component, without taking the influence of the liquid guiding means into account. The direction of the liquid is modified by the liquid guiding means. The liquid guiding means is suitably arranged such that an optimized flow path of liquid during normal operation is obtained.

For example, when a plurality of liquid outlet openings are arranged in the sidewall, some or all of them are provided with liquid guiding means which can be arranged such that the liquid is relatively evenly distributed over a selected, relatively large area on the tray below. In this way the average velocity of liquid impacting on the receiving area can be minimized. Therefore the liquid receiving area can be provided with openings; in most cases normal perforations can be provided like on the entire bubble area. Preferably the liquid guiding means are arranged such that the liquid exiting from a downcomer sidewall is distributed over an as large as possible part of the bubble area of the tray below, while still keeping sufficient travel distance from the nearest inlet opening of a downcomer on the lower tray.

In a particular embodiment, the tray according to the invention is arranged above a lower tray with a downcomer that extends generally parallel with the sidewall of the downcomer of the upper tray and is laterally translated with respect to the downcomer on the upper tray. The liquid guiding means is adjusted such that liquid during normal operation is not received closer to the downcomer inlet opening on the lower tray plate than at least 100 mm, preferably at least 150 mm, most preferably at least 200 mm.

When the downcomer of the tray according to the invention is a rectangular downcomer, it can also be arranged above a lower tray provided with at least two downcomers that extend generally parallel with the sidewalls of the downcomer of the upper tray, and wherein the downcomer on the upper tray is arranged between, preferably symmetrically between, the downcomers on the lower tray. The particular advantage of the liquid guiding means in this embodiment is that it allows to adjust the horizontal velocity component of the liquid exiting from the outlet openings in the sidewall of the upper downcomer. In this way it becomes possible to make optimum use of the area between the downcomers on the lower tray, using a relatively large part as liquid receiving area but still providing sufficiently long flow path length on the lower tray for gas/liquid contact, before liquid enters into the nearest downcomer opening that extends transverse to the flow path. Suitably, the guiding means is adjusted such that liquid during normal operation is not received closer to the downcomer inlet opening on the lower tray than at least 100 mm, preferably at least 150 mm, most preferably at least 200 mm.

A liquid guiding means is any device that influences the direction of liquid flow at an outlet opening in the downcomer sidewall during normal operation, compared to the situation wherein the liquid guiding means is not installed.

Suitable guiding means are guiding lips or guiding spouts, which are preferably attached to the sidewall near the outlet opening. A guiding spout or lip can e.g. be a planar, trough-like, or tubular. Preferably the guiding means is integrally formed from the sidewall during manufacturing of the outlet opening, such as by cutting and bending or punching. Then, no additional parts need to be attached to the sidewall, therefore integrally formed guiding means allow efficient manufacturing.

The direction of liquid exiting through the liquid outlet can in general be described by a velocity vector having a vertical and a horizontal velocity component. The direction of liquid is changed when the magnitude of the vertical velocity component, and/or the direction or magnitude of the horizontal velocity component is changed. The guiding means can be arranged to influence the velocity vector of liquid exiting during normal operation through the liquid outlet opening in any direction, depending on the practical situation. The vertical velocity component and/or the horizontal velocity component can be changed in order to change the direction of liquid. By increasing the magnitude of the vertically upward velocity component (equivalent to decreasing the vertically downward velocity component), the liquid flow is lifted and can travel a greater horizontal distance than without the liquid guiding means, before it impinges on the lower tray. The vertically upward velocity component can also be decreased so as to limit the horizontal travel distance. By changing the direction of the horizontal velocity component the direction of liquid flow over the lower tray can be influenced. The magnitude of the horizontal velocity component can also be changed.

BRIEF DESCRIPTION OF THE DRAWINGS

The invention will now be described by way of example in more detail with reference to the drawings, wherein.

Where like reference numerals are used in the Figures they refer to similar parts.

DETAILED DESCRIPTION OF THE INVENTION

Figure 1:
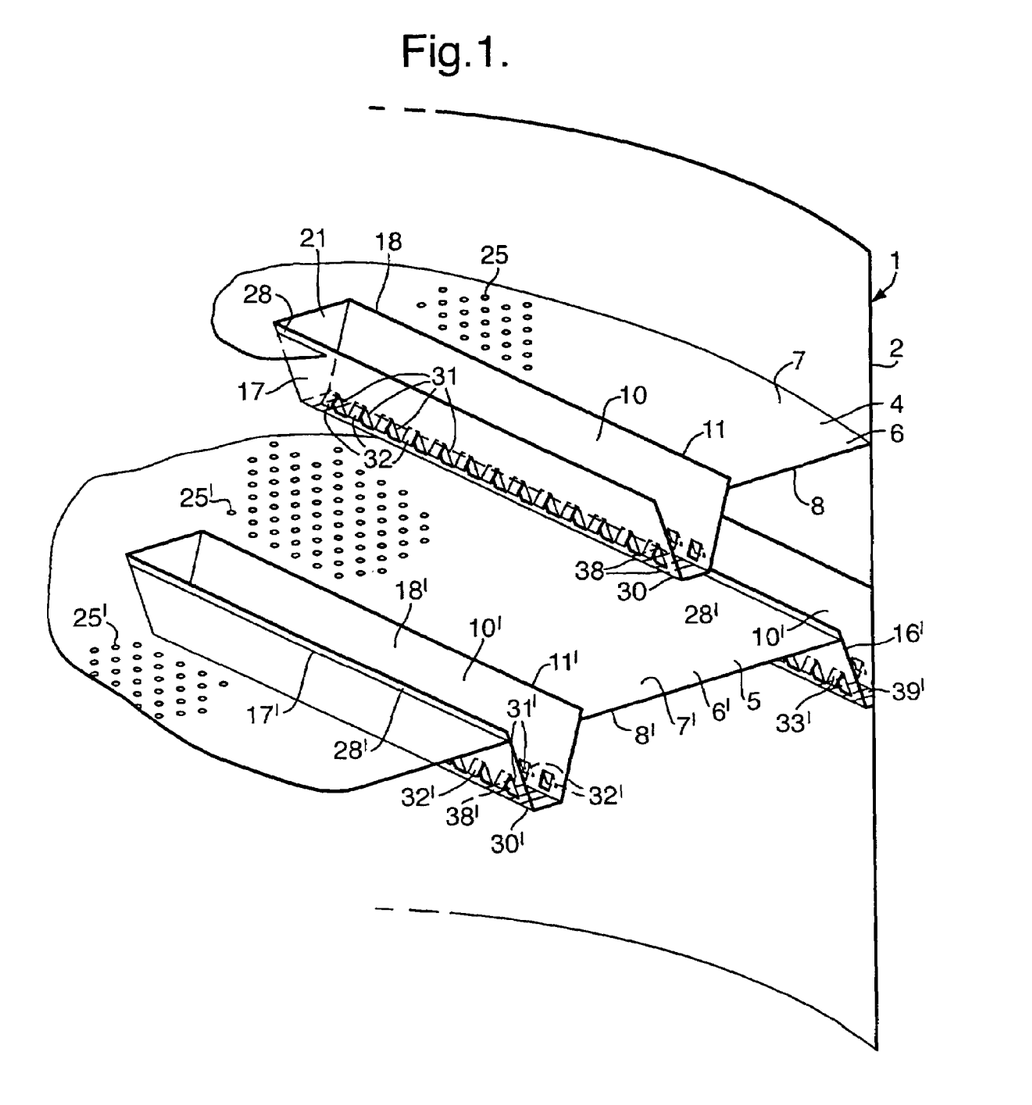
FIG. 1 shows schematically a column wherein two trays according to a first embodiment of a tray according to the present invention are arranged.
Figure 2:
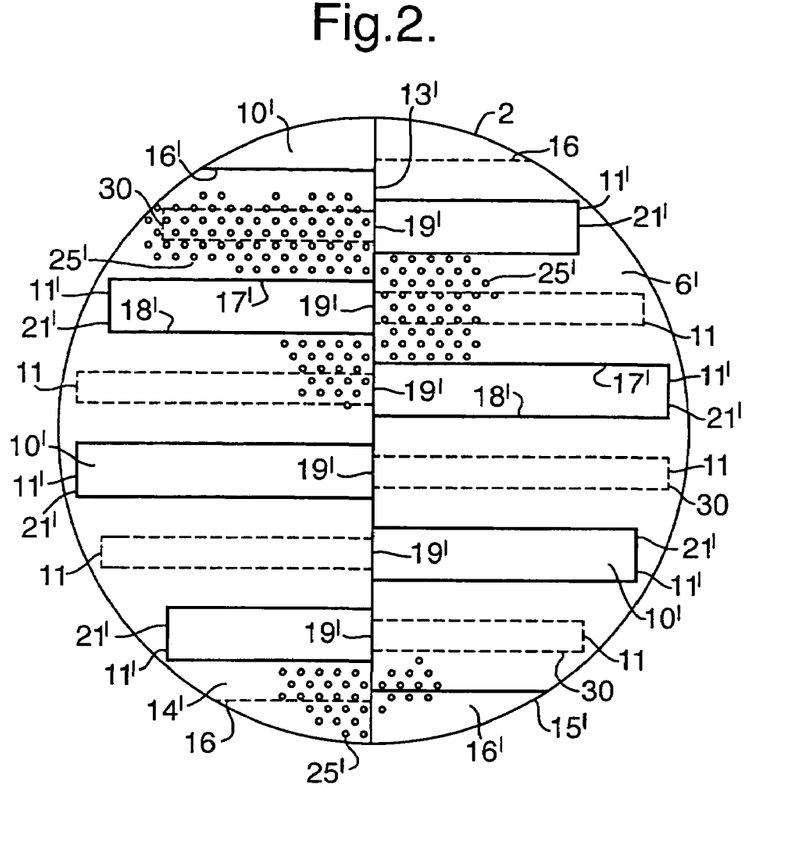
FIG. 2 shows schematically a top view of the trays of FIG. 1.

Reference is made to FIGS. 1 and 2. FIG. 1 shows part of a vertical column 1 having a wall 2 wherein two trays 4, 5 according the present invention are horizontally arranged. Both the upper tray 4 and the lower tray 5 are basically formed of a tray plate 6, 6' having top surfaces 7,7' and bottom surfaces 8,8', which tray plate is adapted so that it can be mounted to the column wall 2. Corresponding parts on the trays 4 and 5 are indicated by the same reference numeral, and are primed for parts on tray 5. In the tray plate 6, 6' openings 10, 10' are arranged in which downcomers 11, 11' are mounted.

FIG. 1 shows only portions of the trays 4,5. A particular example for the arrangement of a plurality of downcomers is shown in the top view on the tray 5 in FIG. 2, wherein the downcomers are only indicated by their inlet openings 10' for the sake of clarity. Tray 5 is provided with a supporting beam 13' along a diametrical line dividing the tray in two sections 14',15'. Such a supporting beam is preferably present in trays having a large diameter, such as above 2 meters. Smaller diameter trays can be manufactured with or without a supporting beam.

Each tray section 14,15;14',15' is provided with a plurality of parallel downcomers 11,16;11',16'. Each downcomer 11;11' is substantially rectangular having two elongated sidewalls 17,18;17',18' along its length and two smaller end walls 19,21;19',21' along its width. Preferably 1-10 rectangular shaped parallel downcomers are present in one tray section. Additionally one or more segmental downcomers 16;16' may be present on a tray section 14,15;14',15' where the diametrical line meets the column wall. A segmental downcomer 16' as shown in FIGS. 1 and 2 has an inlet opening which has a side running parallel to the longitudinal side of the rectangular downcomers, a side along the column wall and a side along part of the diametrical line. More general, a segmental downcomer is a downcomer that has a relatively large portion, 25% or more, of the circumference of its inlet opening running along the column wall.

The downcomers 11' extend perpendicular in horizontal direction from the supporting beam 13' to the circumferential of the tray 5. Downcomer end walls 19' of downcomers 11' in both tray sections 14',15' meet the supporting beam 13' in an alternating manner so that a staggered arrangement of downcomers is formed as shown. The opposite end walls 21' nearest the column wall 2 can be parallel to ends 19' as shown. Alternatively the end walls 21' can also follow the circumferential of the tray (column wall), in for example a straight or curved line, in order to optimise downcomer opening area, and it shall be clear that such a downcomer is a rectangular downcomer as it still has a substantially rectangular inlet opening.

The upper tray 4 differs from the lower tray 5 in that it is mirrored along the supporting beam 13. This results in that the downcomers 11,16 of the upper tray 4 are vertically placed above perforated area 25' of tray 5 just below. FIG. 2 indicates schematically the vertical projection of downcomers 11 and 16 of tray 4 onto tray 5 with dashed lines. The dashed lines indicate the size of the lower ends (bottom plates 30) of the sloped downcomers 11,16, which would substantially correspond to the liquid receiving area on tray 5 if the downcomers would only have liquid outlet openings in the bottom plate. The downcomers of tray 5 are laterally translated with respect to the downcomers of tray 4 from which they receive liquid. Suitably the downcomers of tray 4 are symmetrically arranged in between the downcomers of tray 5. For example, the rectangular downcomer 10 on the upper tray 4 is shown in FIG. 1 symmetrically between the rectangular downcomer 10' and the segmental downcomer 16' on the lower tray 5. The overall flow direction of liquid over the tray plates is perpendicular to the length of the downcomers. The horizontal distance between the lower end of a sidewall of a downcomer (equivalent to a longitudinal side of a bottom plate 30) on the upper tray and the nearest upper end of a sidewall on the lower tray (longitudinal side of the nearest inlet opening) is normally at least 200 mm, preferably at least 250 mm to allow for sufficient flow path length of liquid on the lower tray.

Preferably, the entire area of the tray plate 6' outside of the downcomers 11',16' on tray 5 is perforated with openings 25' (shown in the Figures only on part of the tray for the sake of clarity) and forms bubble area, including in particular the area vertically directly below the downcomer outlets of the downcomers of the upper tray 4. The bubble area therefore serves as liquid receiving area at the same time. Likewise the entire area outside the downcomers 11,16 on tray 4 preferably forms bubble area.

The downcomers on the trays as shown in FIG. 1 are provided with an inlet weir 28;28'. An inlet weir is a device positioned on or about on the boundary of the bubble area and the downcomer inlet opening, which ensures that a certain height of liquid is present on the upper surface of the bubble area.

FIG. 1 shows downcomers that are sloped, meaning that the downwardly directed downcomer sidewalls 17,18;17', 18' are inclined towards each other in downward direction. Conventional sloped downcomers are e.g. discussed the general textbook "Distillation Operation" by Henry Z. Kister, McGraw-Hill Inc, 1990, pages 173-175, and commonly the ratio of the cross-sectional area of the inlet opening at tray level to the cross-sectional area at the bottom of a sloped downcomer is between 1.5 and 2.0 and typically 1.7.

The present invention is not limited to the use with downcomers of such ratio of cross sections. The downcomers can also e.g. have vertical side walls. The downcomer sidewalls may be of any shape, for example having a vertical top part combined with a sloped lower part. A sloped or inclined sidewall suitably forms an angle of 45 degrees or less with the vertical.

The downcomers can in particular be very sloped downcomers as shown in FIG. 1. Very sloped downcomers are disclosed in International Patent Application Publication No. WO 01/60485. In such a very sloped downcomer the ratio of the cross-sectional area of the downcomer at the downcomer inlet opening at tray level to the cross-sectional area defined by the lower end of the downcomer sidewalls at the lower end is 2.0 or higher, in particular 2.5 or higher, more preferably 3.33 or higher. The downcomer sidewalls can have a V-shape in vertical cross section. Preferably, the lower ends of the downcomer side walls are connected via a horizontal plate 30 having a cross section of at least 5%, more preferably at least 10%, of the cross section of the downcomer inlet opening.

As pointed out in WO 01/60485, trays provided with very sloped downcomers show a lower tendency of flooding due to downcomer backup and downcomer choking limitations, in particular less froth backup in the downcomers is observed. The flooding mechanisms including downcomer back-up and downcomer choking are described in the above referred to general textbook "Distillation Design", Henry Z. Kister, McGraw-Hill Inc, 1992, page 267-291.

In the embodiment shown in FIG. 1 and in accordance with the present invention, the sidewalls 17,18;17',18' of the downcomers 11;11' are provided with liquid outlet openings 31;31'. The liquid outlet openings 31;31' are preferably arranged near the lower end of the sidewall 17,18, below the level of liquid which is formed in the downcomer 11 during normal operation such that the liquid outlets are sealed by the liquid against inflow of gas, vapour or froth.

FIG. 1 shows a single row of rectangular openings 31, which are manufactured by cutting or punching the sidewall along three sides of a rectangle. The upper side of each rectangle is not cut, and the cut-out part is bent outwardly by an angle of less then 90 degrees with the sidewall, so that integrally formed guiding lips 32 are formed as shown. The lips serve as liquid guiding means. Without the guiding lips 32, the liquid would initially eject from the openings 31 as a stream forming an angle of 90 degrees with the sidewall, so would have a relatively large horizontal velocity component, which can result in liquid being received on the lower tray too close to the nearest downcomer inlet opening. The lips 32 push the ejecting liquid somewhat downwards, and in this way the area on the lower tray that receives liquid can be adjusted by adjusting the angle between the guiding lip and the sidewall. Suitably the guiding means 32 is adjusted such that liquid during normal operation is not received closer to the downcomer inlet opening on the lower tray than at least 100 mm, preferably at least 150 mm, most preferably at least 200 mm (measured in the perpendicular direction to the length of the downcomer which is in the overall flow direction on the tray plates), in order to provide for a sufficiently long flow path of liquid on the lower tray.

Guiding lips are suitably also arranged on the outlet openings in the sidewall of segmental downcomers, as shown at reference numeral 33' for segmental downcomer 16'.

In addition to the liquid outlet openings in the sidewalls of the downcomers according to the present invention, the horizontal bottom plate of downcomer can also be provided with outlet openings. These bottom outlet openings can be e.g. slits 38 as shown in FIG. 1, but other shapes are also possible such as circular openings or slits parallel to the sidewalls of the downcomer. In this way the distribution of liquid over the receiving area on the lower tray can be further optimised, so that a relatively even distribution is achieved. Also, the lower end of a segmental downcomer can be provided with further liquid outlets 39'.

Figure 3:
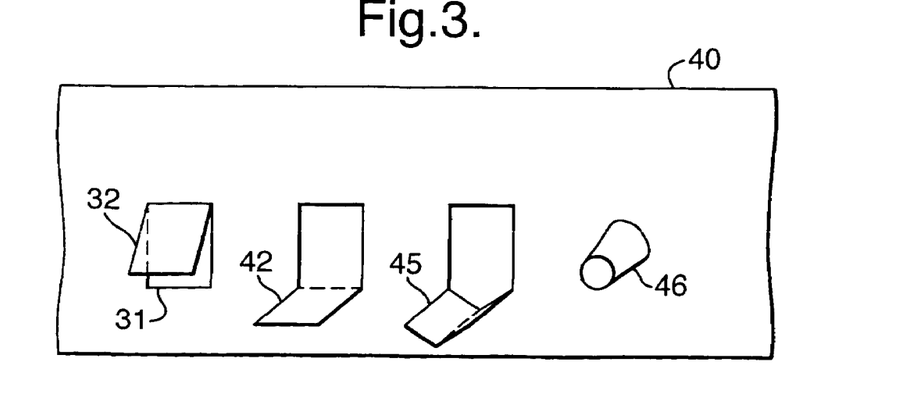
FIG. 3 shows schematically several embodiments of liquid guiding means of the invention.

FIG. 3 shows schematically different embodiments of openings with guiding means in a sidewall 40 of a downcomer. Rectangular opening 31 and liquid lip 32 are the same as already discussed with reference to FIG. 1.

Alternatively, the guiding lips can be attached to the lower end of the opening, as shown at reference numeral 42. Such liquid guiding lips 42 serve to distribute the liquid over a larger area on the tray below than without the lips, depending on the angle they form with the sidewall. Also, such guiding lips 42 opened from below form an extra barrier to prevent vapour or gas from flowing into downcomer through the liquid outlet openings. Guiding lips 42 can be manufactured in essentially the same way as guiding lips 32, e.g. by punching or cutting and bending.

Guiding lips do not need to be flat, as indicated for example at the guiding lip 45. The guiding means can also have the form of a guiding spout as indicated at reference numeral 46.

EXAMPLE

Consider a conventional rectangular sloped, truncated downcomer, having liquid outlet openings arranged in its bottom plate, in the form of a series of slots perpendicular to the elongated sidewalls. Liquid exiting the downcomer typically has an exit velocity ranging from 0.5 m/s to 1.5 m/s. The bottom plate of the truncated downcomer is typically 100 mm wide (measured perpendicular to the elongated sidewalls), and typically arranged 50-200 mm, in particular 100-200 mm above the level of the lower tray. Over this distance the liquid can distribute more or less evenly over the rectangular shaped volume directly underneath the bottom plate. Assume that the slots account for 50% of the area of bottom plate. Then, the liquid impacts on to the lower tray in the 100 mm wide area directly underneath the downcomer at an impact velocity which is a factor 2 lower than the exit velocity; in this case the impact velocity is typically 0.25 m/s-0.75 m/s. With such a high impact velocity it is very difficult to perforate the area below the downcomer, if anything special tray openings such as bubble caps or floating caged valves must be used in order to deal with the liquid penetration problem.

By arranging side slots with guiding means the liquid receiving area on the lower tray can be increased by a factor of up to 5 or more. If, for example, the openings and guiding means are arranged such that liquid is evenly distributed over an area of a width of 300 mm (instead of 100 mm), the impact velocity is reduced to typically 0.08 m/s-0.25 m/s. Such impact velocities do not normally lead to liquid penetration problems when perforations are arranged on the receiving tray.

The arrangement of downcomers as shown in FIG. 2 is merely an example, and the invention can be used in combination with other tray layouts. Other examples of tray layouts including rectangular downcomers are described for example in U.S. Pat. No. 5,702,647, U.S. Pat. No. 5,382,390, GB-A-1 416 731 and U.S. Pat. No. 3,410,540.

Figure 4:
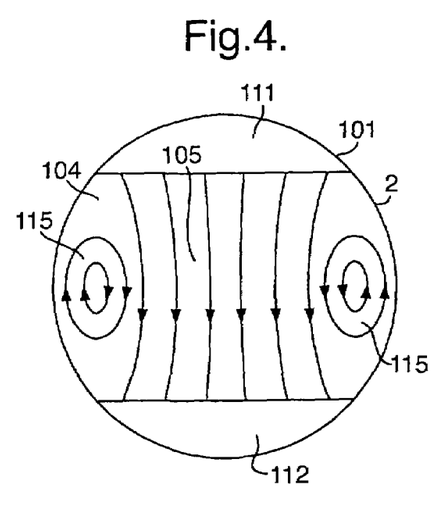
FIG. 4 shows schematically a liquid flow pattern in a conventional cross-flow tray.
Figure 5:
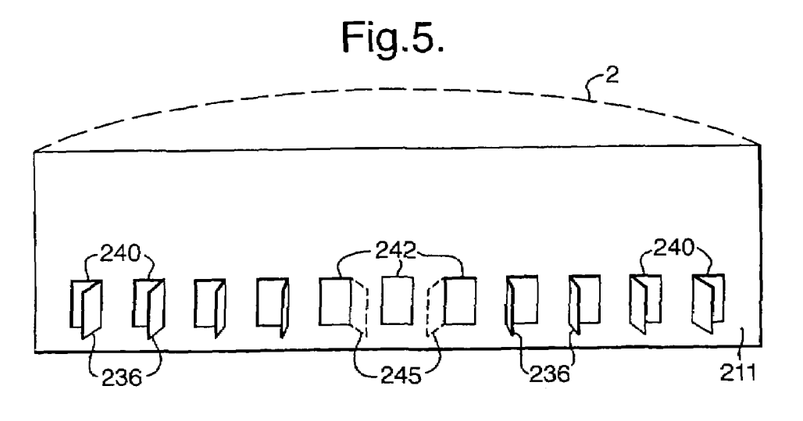
FIG. 5 shows schematically a side view on a segmental downcomer sidewall according to the present invention.
Figure 6:
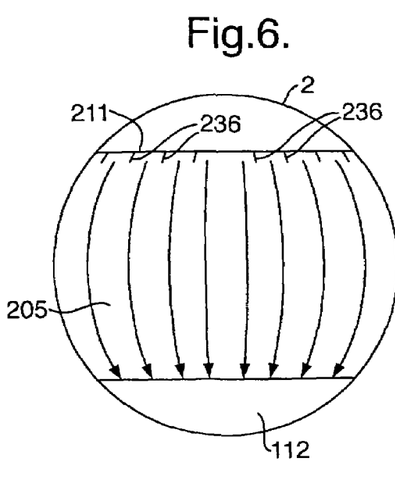
FIG. 6 shows schematically a flow pattern in a cross-flow tray using the downcomer of FIG. 4.

Reference is made to FIGS. 4-6 showing a further embodiment of the present invention. FIG. 4 illustrates a top view of the normal flow pattern 105 on a conventional cross-flow tray 104 in a column 101, wherein liquid is received from the liquid outlet of a conventional truncated downcomer 111 of an upper tray, and flows over the tray to the inlet of the downcomer 112 through which it is removed to a still lower tray. This type of flow pattern leads to liquid recirculation (back mixing) in areas 115 and this can lead to lower tray efficiency. This problem is discussed e.g. in U.S. Pat. No. 4,956,127, and this patent specification discloses as a solution that a raised inlet area can be provided underneath the segmental downcomer 111, and which inlet area is provided with directional flow vanes which are arranged to direct the flow so as to prevent backmixing.

By using a tray according to the invention, a simpler solution of the backmixing problem can be achieved. Openings with liquid guiding means are provided in the sidewall of the downcomer, such that the liquid is deflected in the horizontal plane, so that the liquid at each outlet is guided to flow in an optimum direction on to and over the tray. A schematic arrangement of a row of slots with guiding lips in the sidewall of the segmental downcomer 211 according to the invention is shown in FIG. 5. The guiding lips 236 are arranged such that the liquid exiting from the slots 240 close to the column wall 2 is guided along the wall 2. The slots 242 in the centre suitably guide the liquid along a diameter to the opposite side of the tray, and therefore no guiding means are needed in the centre, or the lips can be arranged by bending to an angle larger than 90 degrees as indicated at 245. The angle of the guiding lips with the sidewall can for example be 30-45 degrees at the sides close to the column wall, and the angle suitably gradually increases more towards the centre.

In this way a plug flow pattern 205 as shown in FIG. 6 can be realized, wherein substantially no backmixing occurs so that tray efficiency is improved.

The downcomers of a tray according to the present invention are truncated downcomers. U.S. Pat. No. 4,550,000 describes an example of a rectangular truncated downcomer. A truncated downcomer is characterised in that, when in use, its liquid discharge openings are not submerged in the liquid level which is present just on the bubble area of the lower tray. In other words, no liquid seal is present between the liquid discharge opening of the downcomer and the space above a consecutive lower tray. Truncated downcomers preferably extend to between 30 and 90% and preferably between 50 and 75% of the tray spacing below a tray. Furthermore the liquid discharge openings of truncated downcomers will be positioned at a higher vertical position than the top end of an optional weir on the lower tray. Tray spacing is defined as the distance between two consecutive gas-liquid contacting trays in a column. Typical tray spacing is between 0.2 and 1 m.

The downcomers can be provided with an inlet weir along their inlet opening. The inlet weir can be disposed vertically or inclined. The inlet weir may run along said entire boundary or may optionally be interrupted. The inlet weir may be solid. Preferably openings are present in the inlet weir. The downcomer wall and weir can be arranged in one plane and advantageously made from one metal plate. The height of the inlet weir is preferably less than 50% of the distance between the lowest liquid discharge openings of the next higher tray and the liquid receiving area below said openings. More preferably the vertical height is between 0.01 and 0.05 m.

For the present invention it is not critical which kind of openings are used in the bubble area and/or liquid receiving area of the tray. Examples of possible openings are sieve tray openings, valve tray openings, bubble cap openings and fixed valve openings. Examples of these openings can be found in general textbooks such as the above-mentioned general textbook "Distillation Design" of Kister, on pages 260-267.

A rectangular downcomer is preferably provided with a rectangular shaped anti-jump baffle, vertically positioned along the longitudinal centre in the opening of the downcomer. This anti-jump baffle plate is suitably supported from both sides by supports, which are fixed to the inside of the downcomer walls.

It has further been found advantageous to provide the downcomer with so-called anti-sloshing baffles. Applicants have found that when vertical plates spaced apart from each other and arranged parallel to the width of the downcomer are present in the lower half of the downcomer less sloshing will occur. Sloshing occurs especially in elongated downcomers, for example longer than 0.5 m, where liquid moves from one end to the other and back. These plates may extend a certain distance from the inner side of the downcomer sidewall or may optionally extend all the way to the opposite downcomer sidewall. In the last embodiment the anti-sloshing baffles will also add to the mechanical strength of the downcomer itself. In an even more preferred embodiment the anti-sloshing baffles are at the same time the supports for the above described anti-jump baffle.

The tray according to the invention is preferably used in a gas-liquid contacting or separation column, which column is provided with these trays, axially spaced away from each other. Contacting can be absorption processes wherein a downwardly moving liquid is contacted with an upwardly moving gas. Separation is typically a distillation process to separate one or more components from a feed. Typically the feed of a distillation process is supplied to an intermediate position in the column, wherein trays are present above and below said inlet position. Such a column is further provided with reboiler, condensation and reflux means.

That which is claimed is:

1. A gas-liquid contacting tray suitable for horizontal mounting in a normally vertical column for counter-currently contacting gas and liquid, which tray comprises:
    an upper tray having a tray plate with top and bottom surfaces and a downcomer inlet opening, said upper tray being provided with a truncated downcomer for guiding liquid from the top surface of the tray plate to a downcomer outlet opening below the tray plate, the downcomer having a sidewall extending downwardly from the downcomer inlet opening, the sidewall having a liquid outlet opening provided with a liquid guiding means,
    a lower tray having a tray plate with top and bottom surfaces and at least two downcomer inlet openings, the lower tray being provided with at least two truncated downcomers, said downcomers having sidewalls extending downwardly from said downcomer inlet openings, the sidewalls having liquid outlet openings provided with liquid guiding means, the sidewalls of the downcomers of the lower tray extending generally parallel with the sidewalls of the downcomer of the upper tray, and wherein the downcomer on the upper tray is arranged generally symmetrically between two downcomers on the lower tray.

2. The gas-liquid contacting tray according to claim 1, wherein the liquid guiding means is a guiding lip or a guiding spout.

3. The gas-liquid contacting tray according to claim 2, wherein the liquid guiding means is integrally formed with the sidewalls of the downcomers on the upper and lower trays.

4. The gas-liquid contacting tray according to claim 3, wherein the liquid guiding means is arranged to influence the magnitude of the vertical velocity component of the liquid exiting through the liquid outlet opening during normal operation.

5. The gas-liquid contacting tray according to claim 4, wherein the liquid guiding means is arranged to influence the direction of the horizontal velocity component of the liquid exiting the liquid outlet opening during normal operation.

6. The gas-liquid contacting tray according to claim 5, wherein the downcomers are selected from the group consisting of a sloped downcomer, a very sloped downcomer, a downcomer with vertical sidewalls, a downcomer with partly vertical and partly inclined sidewalls.

7. The gas-liquid contacting tray according to claim 6, wherein a plurality of liquid outlet openings is arranged in the side walls of the downcomers on the upper and lower trays, at least part of which plurality is provided with liquid guiding means.

8. A gas-liquid contacting tray suitable for horizontal mounting in a normally vertical column for counter-currently contacting gas and liquid, which tray comprises:
    an upper tray having a tray plate with top and bottom surfaces and a downcomer inlet opening, said upper tray being provided with a downcomer for guiding liquid from the top surface of the tray plate to a downcomer outlet opening below the tray plate, the downcomer having a sidewall extending downwardly from the downcomer inlet opening, the sidewall having a plurality of liquid outlet openings arranged in the sidewall, at least part of which plurality is provided with a liquid guiding means integrally formed with the sidewalls, said liquid guiding means comprising a guiding lip or a guiding spout and arranged to influence the magnitude of the vertical velocity component and the horizontal velocity component of the liquid exiting through the plurality of liquid outlet openings during normal operation, a lower tray having a tray plate with top and bottom surfaces and at least two downcomer inlet openings, the lower tray being provided with at least two downcomers, said downcomers having sidewalls extending downwardly from said downcomer inlet openings, the sidewalls having a plurality of liquid outlet openings arranged in the sidewall, at least part of which plurality is provided with a liquid guiding means integrally formed with the sidewalls, said liquid guiding means comprising a guiding lip or a guiding spout and arranged to influence the magnitude of the vertical velocity component and the horizontal velocity component of the liquid exiting through the plurality of liquid outlet openings during normal operation, the sidewalls of the downcomers of the lower tray extending generally parallel with the sidewalls of the downcomer of the upper tray, wherein the downcomer on the upper tray is arranged generally symmetrically between two downcomers on the lower tray, and wherein the downcomers on the upper and lower trays are selected from the group consisting of a sloped downcomer, a very sloped downcomer, a downcomer with vertical sidewalls, a downcomer with partly vertical and partly inclined sidewalls, and said downcomers have a substantially horizontal bottom plate, and wherein a further liquid outlet opening is arranged in the bottom plate.

9. The gas-liquid contacting tray according to claim 8, wherein the downcomers on the upper and lower trays are rectangular downcomers.

10. The gas liquid contacting tray according to claim 9, wherein the liquid guiding means in the upper tray is adjusted such that liquid during normal operation is not received closer to a downcomer inlet opening on the lower tray plate than at least 100 mm, preferably at least 150 mm, most preferably at least 200 mm.

11. The gas-liquid contacting tray according to claim 9, wherein the downcomers on the lower tray are laterally translated with respect to the downcomer on the upper tray.

12. The gas liquid contacting tray according to claim 11, wherein the liquid guiding means is adjusted such that liquid during normal operation is not received closer to a downcomer inlet opening on the lower tray than at least 100 mm, preferably at least 150 mm, most preferably at least 200 mm.

13. The gas-liquid contacting tray according to claim 1, wherein the upper tray additionally contains a segmental downcomer, and wherein a plurality of liquid outlet openings with guiding means are arranged in a row to guide the liquid so as to form a plug flow pattern on a lower receiving tray during normal operation.

14. The gas-liquid contacting tray according to claim 1, wherein the liquid guiding means is integrally formed with the sidewalls of the downcomers on the upper and lower trays.

15. The gas-liquid contacting tray according to claim 1, wherein the liquid guiding means is arranged to influence the magnitude of the vertical velocity component of the liquid exiting through the liquid outlet opening during normal operation.

16. The gas-liquid contacting tray according to claim 2, wherein the liquid guiding means is arranged to influence the magnitude of the vertical velocity component of the liquid exiting through the liquid outlet opening during normal operation.

17. The gas-liquid contacting tray according to claim 1, wherein the liquid guiding means is arranged to influence the direction of the horizontal velocity component of the liquid exiting the liquid outlet opening during normal operation.

18. The gas-liquid contacting tray according to claim 2, wherein the liquid guiding means is arranged to influence the direction of the horizontal velocity component of the liquid exiting the liquid outlet opening during normal operation.

19. The gas-liquid contacting tray according to claim 3, wherein the liquid guiding means is arranged to influence the direction of the horizontal velocity component of the liquid exiting the liquid outlet opening during normal operation.

20. The gas-liquid contacting tray according to claim 1, wherein the downcomers are selected from the group consisting of a sloped downcomer, a very sloped downcomer, a downcomer with vertical sidewalls, a downcomer with partly vertical and partly inclined sidewalls.

21. The gas-liquid contacting tray according to claim 2, wherein the downcomers are selected from the group consisting of a sloped downcomer, a very sloped downcomer, a downcomer with vertical sidewalls, a downcomer with partly vertical and partly inclined sidewalls.

22. The gas-liquid contacting tray according to claim 3, wherein the downcomers are selected from the group consisting of a sloped downcomer, a very sloped downcomer, a downcomer with vertical sidewalls, a downcomer with partly vertical and partly inclined sidewalls.

23. The gas-liquid contacting tray according to claim 4, wherein the downcomers are selected from the group consisting of a sloped downcomer, a very sloped downcomer, a downcomer with vertical sidewalls, a downcomer with partly vertical and partly inclined sidewalls.

24. The gas-liquid contacting tray according to claim 1, wherein a plurality of liquid outlet openings is arranged in the side walls of the downcomers on the upper and lower trays, at least part of which plurality is provided with liquid guiding means.

25. The gas-liquid contacting tray according to claim 2, wherein a plurality of liquid outlet openings is arranged in the side walls of the downcomers on the upper and lower trays, at least part of which plurality is provided with liquid guiding means.

26. The gas-liquid contacting tray according to claim 3, wherein a plurality of liquid outlet openings is arranged in the side walls of the downcomers on the upper and lower trays, at least part of which plurality is provided with liquid guiding means.

27. The gas-liquid contacting tray according to claim 4, wherein a plurality of liquid outlet openings is arranged in the side walls of the downcomers on the upper and lower trays, at least part of which plurality is provided with liquid guiding means.

28. The gas-liquid contacting tray according to claim 5, wherein a plurality of liquid outlet openings is arranged in the side walls of the downcomers on the upper and lower trays, at least part of which plurality is provided with liquid guiding means.

29. A gas-liquid contacting tray suitable for horizontal mounting in a normally vertical column for counter-currently contacting gas and liquid, which tray comprises:

an upper tray having a tray plate with top and bottom surfaces and a downcomer inlet opening, said upper tray being provided with a downcomer for guiding liquid from the top surface of the tray plate to a downcomer outlet opening below the tray plate, the downcomer having a sidewall extending downwardly from the downcomer inlet opening, the sidewall having a liquid outlet opening provided with a liquid guiding means, a lower tray having a tray plate with top and bottom surfaces and at least two downcomer inlet openings, the lower tray being provided with at least two downcomers, said downcomers having sidewalls extending downwardly from said downcomer inlet openings, the sidewalls having liquid outlet openings provided with liquid guiding means, the sidewalls of the downcomers of the lower tray extending generally parallel with the sidewalls of the downcomer of the upper tray, wherein the downcomer on the upper tray is arranged generally symmetrically between two downcomers on the lower tray, wherein the downcomers have a substantially horizontal bottom plate, and wherein a further liquid outlet opening is arranged in the bottom plate.

30. The gas-liquid contacting tray according to claim 29, wherein the liquid guiding means is a guiding lip or a guiding spout.

31. The gas-liquid contacting tray according to claim 30, wherein the liquid guiding means is integrally formed with the sidewalls of the downcomers on the upper and lower trays.

32. The gas-liquid contacting tray according to claim 31, wherein the liquid guiding means is arranged to influence the magnitude of the vertical velocity component of the liquid exiting through the liquid outlet opening during normal operation.

33. The gas-liquid contacting tray according to claim 32, wherein the liquid guiding means is arranged to influence the direction of the horizontal velocity component of the liquid exiting the liquid outlet opening during normal operation.

34. The gas-liquid contacting tray according to claim 33, wherein the downcomers are selected from the group consisting of a sloped downcomer, a very sloped downeemer, a downcomer with vertical sidewalls, a downcomer with partly vertical and partly inclined sidewalls.

* * * * *